United States Patent
Zhao et al.

(10) Patent No.: US 10,764,418 B2
(45) Date of Patent: Sep. 1, 2020

(54) METHOD, DEVICE AND MEDIUM FOR APPLICATION SWITCHING

(71) Applicant: Beijing Xiaomi Mobile Software Co., Ltd., Haidian District, Beijing (CN)

(72) Inventors: Jiankai Zhao, Beijing (CN); Xiehao Bao, Beijing (CN); Wankun Yang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 148 days.

(21) Appl. No.: 15/627,423

(22) Filed: Jun. 19, 2017

(65) Prior Publication Data
US 2017/0371526 A1 Dec. 28, 2017

(30) Foreign Application Priority Data
Jun. 23, 2016 (CN) .......................... 2016 1 0466534

(51) Int. Cl.
| | |
|---|---|
| *H04M 1/725* | (2006.01) |
| *H04M 1/57* | (2006.01) |
| *G06F 3/0481* | (2013.01) |
| *G06F 3/0484* | (2013.01) |
| *G10L 15/26* | (2006.01) |
| *H04M 3/42* | (2006.01) |

(52) U.S. Cl.
CPC .... *H04M 1/72522* (2013.01); *G06F 3/04817* (2013.01); *G06F 3/04845* (2013.01); *G10L 15/265* (2013.01); *H04M 1/57* (2013.01); *H04M 1/72563* (2013.01); *H04M 1/72597* (2013.01); *H04M 3/42042* (2013.01)

(58) Field of Classification Search
CPC ................................................ H04M 1/72522
See application file for complete search history.

(56) References Cited

U.S. PATENT DOCUMENTS 7,003,463 B1 * 2/2006 Maes ................ H04L 29/06027
704/231
7,310,416 B1 * 12/2007 Henderson ............ H04M 1/576
340/7.56

(Continued)

FOREIGN PATENT DOCUMENTS

| CN | 101040508 A | 9/2007 |
|---|---|---|
| CN | 103281434 A | 9/2013 |

(Continued)

OTHER PUBLICATIONS

International Search Report of PCT/CN2016/100975.
(Continued)

*Primary Examiner* — William L Bashore
*Assistant Examiner* — Nathan K Shrewsbury
(74) *Attorney, Agent, or Firm* — Jun He Law Offices P.C.; James J. Zhu

(57) ABSTRACT

A method and device for application switching, and a medium are provided. The method includes: identifying an incoming call number to obtain a number type of the incoming call number; during the call, determining an application to be used according to the number type; displaying on a display interface prompt information of application switching; and when detecting a switching confirmation operation, displaying a main page of the application on the display interface.

12 Claims, 4 Drawing Sheets

(56) References Cited

U.S. PATENT DOCUMENTS

| | | | | |
|---|---|---|---|---|
| 9,883,025 B1* | 1/2018 | Fujisaki | ............... | H04N 13/356 |
| 2003/0203746 A1* | 10/2003 | Iwase | ................... | H04M 1/605 |
| | | | | 455/569.1 |
| 2004/0208301 A1* | 10/2004 | Urban | ..................... | H04Q 3/72 |
| | | | | 379/142.17 |
| 2005/0138177 A1* | 6/2005 | Davis | ................ | H04L 29/1216 |
| | | | | 709/227 |
| 2008/0137828 A1* | 6/2008 | Chmaytelli | ............. | H04W 4/16 |
| | | | | 379/142.01 |
| 2009/0176484 A1* | 7/2009 | Lee | ....................... | H04M 1/575 |
| | | | | 455/415 |
| 2009/0323911 A1* | 12/2009 | Dury | ................. | H04M 3/42059 |
| | | | | 379/88.22 |
| 2011/0154204 A1* | 6/2011 | Narayanaswamy | ..... | H04N 7/15 |
| | | | | 715/727 |
| 2011/0201320 A1* | 8/2011 | Wosk | ...................... | H04W 4/12 |
| | | | | 455/415 |
| 2011/0231773 A1* | 9/2011 | Dhara | ................. | H04L 12/1818 |
| | | | | 715/738 |
| 2011/0252350 A1 | 10/2011 | Chaudhri | | |
| 2012/0034904 A1* | 2/2012 | LeBeau | ................. | H04W 4/046 |
| | | | | 455/414.1 |
| 2012/0136942 A1* | 5/2012 | Amidon | ................ | H04W 76/10 |
| | | | | 709/206 |
| 2013/0226591 A1* | 8/2013 | Ahn | ........................ | G06F 3/167 |
| | | | | 704/275 |
| 2014/0179281 A1* | 6/2014 | Kim | ........................ | G06F 3/167 |
| | | | | 455/414.1 |
| 2014/0241514 A1* | 8/2014 | Madhavapeddi | ....... | H04M 1/64 |
| | | | | 379/88.04 |
| 2014/0325425 A1* | 10/2014 | Milam | ................... | G06F 3/0482 |
| | | | | 715/777 |
| 2014/0337751 A1* | 11/2014 | Lim | ....................... | G06F 40/279 |
| | | | | 715/744 |
| 2014/0343948 A1* | 11/2014 | Maes | ................ | H04L 29/06027 |
| | | | | 704/270.1 |
| 2015/0128058 A1* | 5/2015 | Anajwala | ................ | H04L 67/22 |
| | | | | 715/739 |
| 2015/0146982 A1* | 5/2015 | Tsai | ..................... | G06K 9/2081 |
| | | | | 382/177 |
| 2015/0254675 A1* | 9/2015 | Kannan | .................. | G06Q 30/02 |
| | | | | 705/304 |
| 2016/0006854 A1 | 1/2016 | Aizawa et al. | | |
| 2017/0195495 A1* | 7/2017 | Deora | ................. | H04M 1/2757 |
| 2017/0353602 A1* | 12/2017 | DeLuca | ........... | H04M 3/42059 |

FOREIGN PATENT DOCUMENTS

| | | |
|---|---|---|
| CN | 103516886 A | 1/2014 |
| CN | 104158972 A | 11/2014 |
| CN | 104639739 A | 5/2015 |
| CN | 104717293 A | 6/2015 |
| CN | 104836924 A | 8/2015 |
| CN | 105430156 A | 3/2016 |
| CN | 105681566 A | 6/2016 |
| CN | 105939424 A | 9/2016 |
| EP | 1784970 A1 | 5/2007 |
| WO | 2010073237 A2 | 7/2010 |
| WO | 2015074553 A1 | 5/2015 |

OTHER PUBLICATIONS

International Search Report for International Application No. PCT/CN2016/100975.
Extended European Search Report for European Application No. 17176270.1.
The First Office Action in Chinese application No. 201610466534.2, dated Jan. 3, 2019.
The office action for European application No. 17176270.1, dated Sep. 20, 2018.
The office action for European application No. 17176270.1, dated Mar. 1, 2019.
The notice of allowance for European application No. 17176270.1, dated Jul. 17, 2019.

* cited by examiner

METHOD, DEVICE AND MEDIUM FOR APPLICATION SWITCHING

CROSS-REFERENCE TO RELATED APPLICATIONS

The present application is based upon and claims priority to Chinese Patent Application No. 201610466534.2, filed Jun. 23, 2016, the entire contents of which are incorporated herein by reference.

TECHNICAL FIELD

The present disclosure generally relates to the terminal technical field, and more particularly, to a method, device and medium for application switching.

BACKGROUND

In our daily lives, we often encounter such situations where when we are making a phone call with a person and the person asks for the telephone number of a third party, we often usually need to exit from the call interface manually, and return to the desktop by tapping a Home button for example, and then search and open the contact list to obtain the mobile phone number of the third party. As another example, when a user is shopping online via e-commerce sites, if some problems occur in the purchasing procedure, and the sellers ask the purchasing information such as the order number or the courier tracking number, the user needs to exit the call interface manually, search the applications one page by one page until find the desired applications and open the corresponding applications to obtain the purchasing information. The above manual searching and opening of applications usually is time consuming, which results in a bad experience for the user and the callee. Thus, if there is provided a method for automatic application switching so that users can obtain related information provided by applications, user experience can be improved.

SUMMARY

Embodiments of the present disclosure provide a method, device and medium for application switching.

According to a first aspect of embodiments of the present disclosure, there is provided a method for application switching, and the method includes: identifying an incoming call number to obtain a number type of the incoming call number; during the call, determining an application to be used according to the number type; displaying on a display interface prompt information of application switching; and when detecting a switching confirmation operation, displaying a main page of the application on the display interface.

According to a second aspect of embodiment, there is provided a device for application switching, and the device includes: a processor; and a memory for storing instructions executable by the processor; wherein the processor is configured to: identify an incoming call number to obtain a number type of the incoming call number; during the call, determine an application to be used according to the number type; display on a display interface prompt information of application switching; and when detect a switching confirmation operation, display a main page of the application on the display interface.

According to a third aspect of embodiments of the present disclosure, there is provided a non-transitory computer-readable storage medium having stored therein instructions that, when executed by a processor of a terminal, causes the terminal to perform a method for application switching, and the method includes: identifying an incoming call number to obtain a number type of the incoming call number; during the call, determining an application to be used according to the number type; displaying on a display interface prompt information of application switching; and when detecting a switching confirmation operation, displaying a main page of the application on the display interface.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
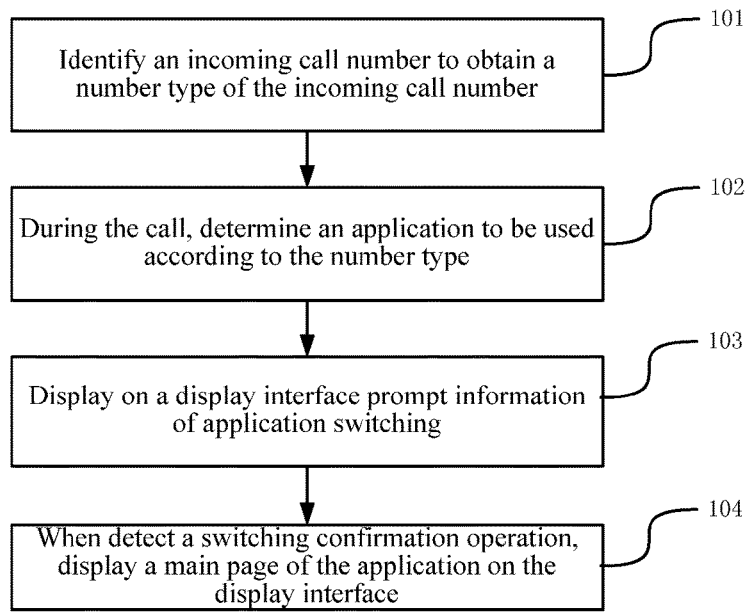
FIG. 1 is a flow chart of a method for application switching according to an exemplary embodiment.

FIG. 1 is a flow chart of a method for application switching according to an exemplary embodiment. As shown in FIG. 1, the method can be applied in a terminal and include the following steps.

In step 101, an incoming call number to obtain a number type of the incoming call number.

In step 102, during the call, an application to be used is determined according to the number type.

In step 103, prompt information of application switching is displayed on a display interface. The prompt information of application switching is configured to prompt a user about whether to switch to the application.

In step 104, when a switching confirmation operation is detected, a main page of the application is displayed on the display interface.

In the method provided by the embodiment of the present disclosure, after an incoming call is received and the number type of the incoming call number is identified, a terminal can automatically determine an application to be used according to the number type, and prompt a user based on the determination result. Then, if the terminal detects a switching confirmation operation from the user, the terminal can automatically display on a display interface a main page of the application. In this way, automatic application switching is realized without a series of operations manually performed by the user such as searching and opening of applications and the like, thereby saving time and efforts, and achieving relatively good intelligence and effects.

In another embodiment, the determining the application to be used according to the number type includes: if the incoming call number is a personal number, obtaining sound information of both communication parties during the call; converting the sound information into text information; determining whether a preset application keyword is included in the text information; and if the application keyword is included in the text information, determining an application indicated by the application keyword as the application to be used.

In another embodiment, the determining the application to be used according to the number type, includes: if the incoming call number is a yellow page number, determining an application name associated with name identification of the incoming call number; and determining an application indicated by the application name as the application to be used.

In another embodiment, the identifying the incoming call number to obtain the number type of the incoming call number, includes: if a number stored in a local contact list is consistent with the incoming call number, obtaining name identification matching the incoming call number from the local contact list, and determining the number type of the incoming call number according to the name identification.

Alternatively, the identifying the incoming call number to obtain the number type of the incoming call number, includes: if no number stored in the local contact list is consistent with the incoming call number, sending the incoming call number to a yellow page server, wherein the yellow page server stores corresponding relationships between a plurality of numbers and name identification; receiving the name identification returned by the yellow page server; and determining the number type of the incoming call number according to the name identification.

In another embodiment, the displaying on the display interface the prompt information of application switching, includes: displaying on a call page the prompt information of application switching in the form of text; or displaying, on an application display page where the application is located, an application icon of the application in an animation of a preset vibrating frequency; or displaying, on an application display page where the application is located, an application icon of the application in a brightness distinguishable from that of other icons.

All of the above optional technical solutions can be combined in any way to form another optional embodiment of the present disclosure and detailed descriptions thereof are omitted here.

Figure 2:
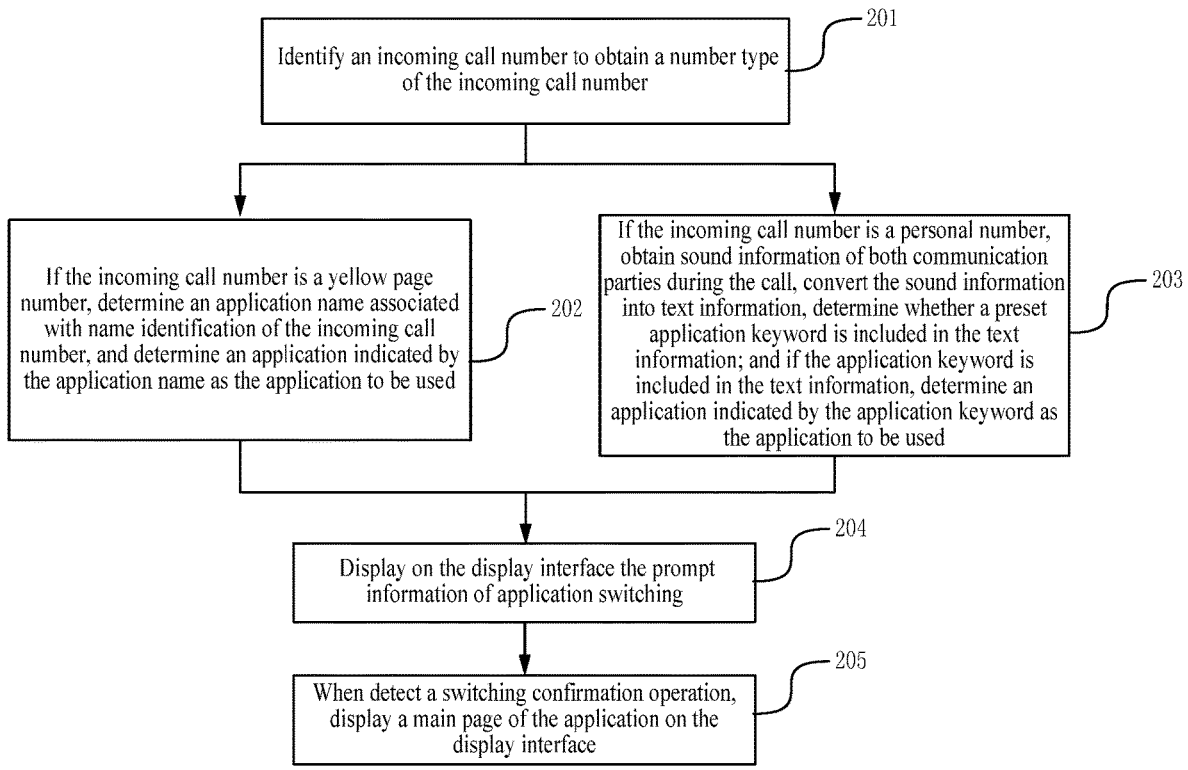
FIG. 2 is a flow chart of a method for application switching according to an exemplary embodiment.

FIG. 2 is a flow chart of a method for application switching according to an exemplary embodiment. As shown in FIG. 2, the method can be applied in a terminal and include the following steps.

In step 201, an incoming call number to obtain a number type of the incoming call number. If the type of the incoming call number is a yellow page number, step 202 is performed; if the type of the incoming call number is a personal number, step 203 is performed.

In an embodiment of the present disclosure, when receiving an incoming call, in order to make a user conveniently know who is initiating the call, the terminal usually searches name identification corresponding to the incoming call number so as to display the name identification as well as the incoming call number on the incoming call display interface. The name identification may be a name or a nick name set by the user for the caller. The terminal may search a local contact list first for the name identification corresponding to the incoming call number.

The terminal can search the local contact list to determine whether the local contact list stores a number consistent with the incoming call number by the following approaches. The terminal reads the local contact list, and matches the incoming call number against all of the contact numbers recorded in the local contact list. If no matching between the contact numbers recorded in the local contact list and the incoming call number is found, it can be determined that the local contact list does not store the number consistent with the incoming call number; if the number of one contact recorded in the local contact list has digits each of which is the same as that of the incoming call number, it can be determined that the local contact list stores the number consistent with the incoming call number. Rather, in addition to the above searching approaches, other searching approaches can also be employed, and embodiments of the present disclosure do not impose specific limitations on this.

If the local contact list does not store the contact number consistent with the incoming call number, the incoming call number can be sent to a yellow page server by a particular application in order to make the user conveniently know related information of the caller. The yellow page server usually stores corresponding relationships between a large quantity of numbers and name identification. For example, the yellow page server can store contact information related to various fields, such as post offices, merchants, banks, or express companies. The particular application can be an application which is installed on the terminal and can be automatically started upon start-up of the terminal, or is started when a log-in state of the user is detected, and embodiments of the present disclosure do not impose specific limitations on this. The particular application can automatically report the incoming call number to the yellow page server so as to obtain the name identification corresponding to the incoming call number from the yellow page server. It should be noted that the terminal can obtain related off-line data from a server by a particular application and store the off-line data on the terminal. By doing this, when the terminal is under an off-line state, even if a strange call is received, the terminal can search information relevant to the strange incoming call according to the off-line data, and embodiments of the present disclosure do not impose specific limitations on this.

It should be noted that after the name identification of the incoming call number is obtained, the terminal can determine the number type of the incoming call number directly according to the name identification. For example, name identification such as "mother", "father" or "Xiao Sun" obviously indicates a person number, and name identification such as "Kentucky Fried Chicken", "McDonald's" or "SF-Express" obviously indicates a yellow page number. The terminal can preset and pre-store rules for determining the number types. For example, the terminal can set and store corresponding relationships between name identification and number types, and then after receiving an incoming call, the terminal can directly determine the number type of the incoming call number according to the determination rules. In addition, in embodiments of the present disclosure, the yellow page number refers to numbers stored in the yellow page server which are used by entities such as merchants, banks, post offices, enterprises or public institutions.

In step 202, if the incoming call number is a yellow page number, an application name associated with name identification of the incoming call number is determined, and an application indicated by the application name is determined as the application to be used.

In embodiments of the present disclosure, if the user accepts the call, the terminal can, during the call, automatically determine the associated application name according to the name identification of the incoming call number and determine the application indicated by the application name as the application which the user may start next.

It should be noted that the application name associated with the name identification can be an application which matches the name identification with a matching degree of greater than a preset threshold. For example, the preset threshold can be 50% or 60% and the like, and embodiments of the present disclosure do not impose specific limitations on this. For example, if the name identification of the incoming call number is "China Merchants Bank" and the preset threshold is 50%, the client for the China Merchants Bank or the client for the Bank of Communications which is installed on the terminal can be taken as the application used. The client for the China Merchants Bank matches the name identification exactly and can thus be taken as the preferred application to be used.

In addition, the application name associated with the name identification can be a kind of integrated applications. For example, yellow page numbers regarding cuisine are associated with application regarding cuisine. For example, if the name identification is Kentucky Fried Chicken, the applications such as Baidu take-out or Meituan take-out which is installed on the terminal can be possibly taken as the application to be used.

In step 203, if the incoming call number is a personal number, sound information of both communication parties during the call is obtained, the sound information is converted into text information, whether a preset application keyword is included in the text information is determined, and if the application keyword is included in the text information, an application indicated by the application keyword is determined as the application to be used.

In an embodiment of the present disclosure, if the incoming call number is a personal number, the name identification of the incoming call number usually carries extremely small quantity of information, and thus the terminal generally cannot determine the application to be used directly according to the name identification. As a result, for such situation, the terminal may need to determine the application to be used further based on the keywords occurring during the call.

During the whole procedure of call, the terminal can obtain the sound information of the both communication parties in real time, and divide the continuous sound information into a plurality of sound fragments, and convert each of the sound fragments into corresponding text information, and finally the call content in the form of text can be obtained. The call content can include a plurality of items of text information, each of which can include one or more words, and embodiments of the present disclosure do not impose specific limitations on this. The application keyword can be whole or a part of the name of an application. The application keyword can be set by the terminal according to the applications installed on the terminal, or can be set by the user, and embodiments of the present disclosure do not impose specific limitations on this. For example, the application keyword is "Baidu take-out", and if the application of "Baidu take-out" is installed on the terminal, the terminal automatically determines the "Baidu take-out" as the application to be used because the application keyword matches the words of "Baidu take-out".

In step 204, prompt information of application switching is displayed on a display interface.

After determining the application to be used according to the above steps, in order to determine whether the user indeed wants to switch the current call page to the application, the embodiment of the present disclosure can further include a step of displaying prompt information of application switching on the display interface. It should be noted that if more than one application is determined as the application to be used, the determined more than one application can be displayed to the user so that the user can perform selection by himself/herself, and embodiments of the present disclosure do not impose specific limitations on this. The prompt information of application switching can be displayed on the display interface using the following approaches, including but not limited to:

In a first approach, the prompt information of application switching is displayed on a call page in the form of text.

Figure 3:
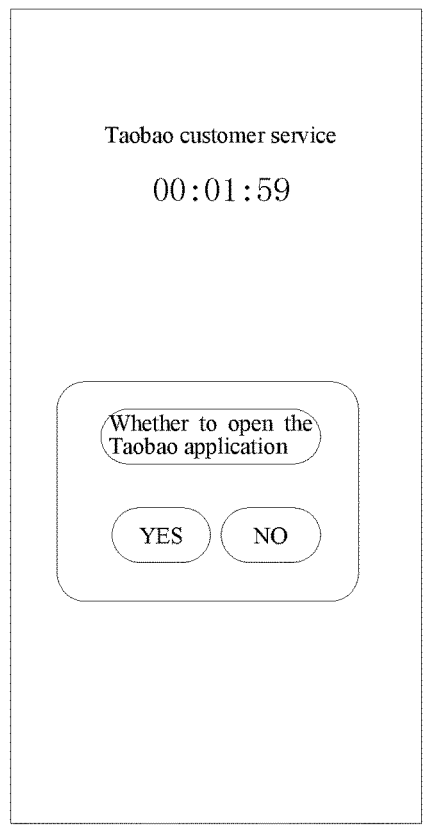
FIG. 3 illustratively shows an interface of a terminal according to an exemplary embodiment.

For this approach, referring to FIG. 3, for example, a prompt box which shows "Whether to open the Taobao application" is directly displayed on the call page. The prompt box includes two options, i.e., "YES" and "NO". If the user taps the "YES" option, it can be determined that the user wants to switch from the current call page to the Taobao application. If the user taps the "NO" option, it can be determined that the user wants to stay at the current call page.

In a second approach, on an application display page where the application is located, an application icon of the application is displayed in an animation of a preset vibrating frequency.

Figure 4:
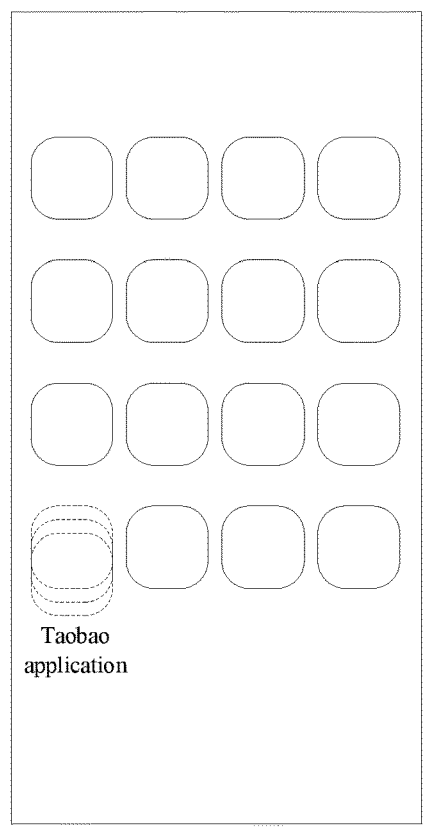
FIG. 4 illustratively shows an interface of a terminal according to an exemplary embodiment.

For this approach, the terminal can automatically switch from the current call page to the application display page where the application to be used is located, and the icon of the application can be vibrated to prompt the user, as shown in FIG. 4. The preset vibrating frequency can be three times per second, for example, and embodiments of the present disclosure do not impose specific limitations on this.

In a third approach, on an application display page where the application is located, an application icon of the application is displayed in a brightness distinguishable from that of other icons.

Figure 5:
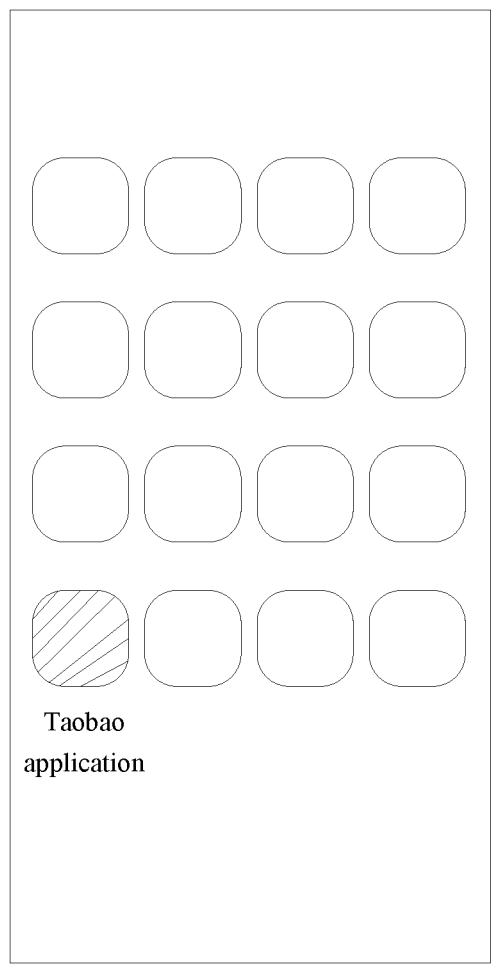
FIG. 5 illustratively shows an interface of a terminal according to an exemplary embodiment.

For this approach, the terminal can automatically switch from the current call page to the application display page where the application to be used is located, and display the icon of the application in highlighted manner so as to prompt the user about whether to open the application, as shown in FIG. 5.

In step 205, when a switching confirmation operation is detected, a main page of the application is displayed on the display interface.

In an embodiment of the present disclosure, after detecting user's tapping operation on the "YES" option in step 204 or detecting user's tapping operation on the highlighted or vibrating icon, it can be determined that a switching confirmation operation is detected, and the terminal switches directly from the current page to the application to be used, and displays the main page of the application on the display interface.

In the method provided by the embodiment of the present disclosure, after an incoming call is received and the number type of the incoming call number is identified, if the incoming call number is a yellow page number, the terminal can determine the application to used automatically according to the name identification, and if the incoming call number is a personal number, the terminal can determine the application to be used according to the application keyword occurring during the call, and can prompt a user based on the determination result. Then, if the terminal detects a switching confirmation operation from the user, the terminal can automatically display on a display interface a main page of the application. In this way, automatic application switching is realized without a series of operations manually performed by the user such as searching and opening of applications and the like, thereby saving time and efforts, and achieving relatively good intelligence and effects.

Figure 6:
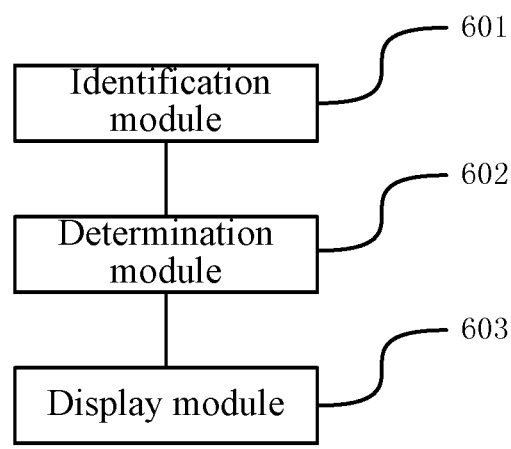
FIG. 6 is a block diagram of a device for application switching according to an exemplary embodiment.

FIG. 6 is a block diagram of a device for application switching according to an exemplary embodiment. Referring to FIG. 6, the device can include an identification module 601, a determination module 602, and a display module 603.

The identification module 601 is configured to identify an incoming call number to obtain a number type of the incoming call number.

The determination module 602 is configured to, during the call, determine an application to be used according to the number type.

The display module 603 is configured to display on a display interface prompt information of application switching.

The display module 603 is further configured to, when a switching confirmation operation is detected, display a main page of the application on the display interface.

In another embodiment, the determination module 602 is configured to: if the incoming call number is a personal number, obtain sound information of both communication parties during the call; convert the sound information into text information; determine whether a preset application keyword is included in the text information; and if the application keyword is included in the text information, determine an application indicated by the application keyword as the application to be used.

In another embodiment, the determination module 602 is configured to: if the incoming call number is a yellow page number, determine an application name associated with name identification of the incoming call number; and determine an application indicated by the application name as the application to be used.

In another embodiment, the identification module 601 is configured to: if a number stored in a local contact list is consistent with the incoming call number, obtain name identification matching the incoming call number from the local contact list, and determine the number type of the incoming call number according to the name identification; or if no number stored in the local contact list is consistent with the incoming call number, send the incoming call number to a yellow page server, wherein the yellow page server stores corresponding relationships between a plurality of numbers and name identification; receive the name identification returned by the yellow page server, and determine the number type of the incoming call number according to the name identification.

In another embodiment, the display module 603 is configured to: display on a call page the prompt information of application switching in the form of text; or display, on an application display page where the application is located, an application icon of the application in an animation of a preset vibrating frequency; or display, on an application display page where the application is located, an application icon of the application in a brightness distinguishable from that of other icons.

In the device provided by embodiments of the present disclosure, after an incoming call is received and the number type of the incoming call number is identified, a terminal can automatically determine an application to be used according to the number type, and prompt a user based on the determination result. Then, if the terminal detects a switching confirmation operation from the user, the terminal can automatically display on a display interface a main page of the application. In this way, automatic application switching is realized without a series of operations manually performed by the user such as searching and opening of applications and the like, thereby saving time and efforts, and achieving relatively good intelligence and effects.

Specific operations performed by individual modules in the device according to the above embodiments have been described in detail in the above descriptions regarding the method of the present disclosure and repeated descriptions are omitted.

Figure 7:
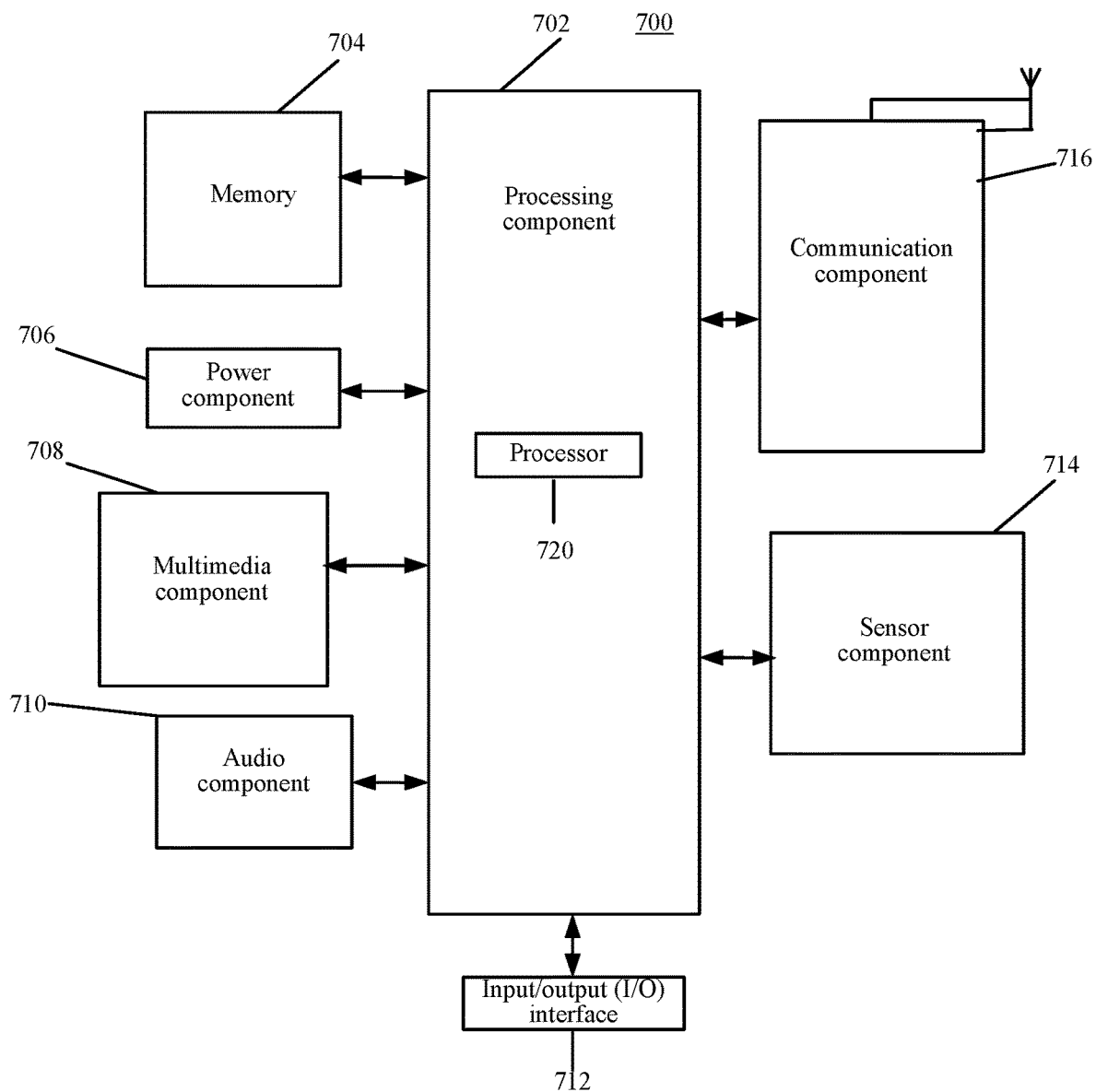
FIG. 7 is a block diagram of a device for application switching according to an exemplary embodiment.

FIG. 7 is a block diagram of a device 700 for application switching according to an exemplary embodiment. For example, the device 700 may be a mobile phone, a computer, a digital broadcast terminal, a messaging device, a gaming console, a tablet, a medical device, exercise equipment, a personal digital assistant, and the like.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the apparatus 500. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2Q or 3Q or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 704 including instructions executable by the processor 720 in the device 700, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium having stored therein instructions that, when executed by a processor of a mobile terminal, causes the mobile terminal to perform above method.

Other embodiments will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for application switching, applied in a terminal device, the method comprising:
    identifying an incoming call number from which an incoming call is initiated;
    if a number stored in a local contact list is consistent with the incoming call number, obtaining name identification matching the incoming call number from the local contact list;
    if no number stored in the local contact list is consistent with the incoming call number, sending the incoming call number to a yellow page server, wherein the yellow page server stores corresponding relationships between a plurality of numbers and name identification, and receiving the name identification returned by the yellow page server;
    automatically determining, based on the name identification and on a set of pre-set and pre-stored rules, a number type of the incoming call number according to whether the name identification was obtained from the local contact list or from the yellow page server;
    during the call, determining an application to be used according to the number type, wherein the determining the application to be used according to the number type comprises:
        determining an application name associated with name identification of the incoming call number if the incoming call number is the yellow page number; and determining an application indicated by the application name as the application to be used;

displaying on a display interface prompt information of application switching; and displaying a main page of the application on the display interface when detecting a switching confirmation operation.

2. The method according to claim 1, wherein the determining the application to be used according to the number type comprises:

obtaining sound information of both communication parties during the call if the incoming call number is the personal number;

converting the sound information into text information;

determining whether a preset application keyword is comprised in the text information; and determining an application indicated by the application keyword as the application to be used if the application keyword is comprised in the text information.

3. The method according to claim 1, wherein the displaying on the display interface the prompt information of application switching comprises:

displaying on a call page the prompt information of application switching in the form of text.

4. The method according to claim 1, wherein the displaying on the display interface the prompt information of application switching comprises:

displaying, on an application display page where the application is located, an application icon of the application in an animation of a preset vibrating frequency.

5. The method according to claim 1, wherein the displaying on the display interface the prompt information of application switching comprises:

displaying, on an application display page where the application is located, an application icon of the application in a brightness distinguishable from that of other icons.

6. A device for application switching, the device comprising:

a processor; and a memory for storing instructions executable by the processor;

wherein the processor is configured to:

identify an incoming call number from which an incoming call is initiated;

if a number stored in a local contact list is consistent with the incoming call number, obtain name identification matching the incoming call number from the local contact list;

if no number stored in the local contact list is consistent with the incoming call number, send the incoming call number to a yellow page server, wherein the yellow page server stores corresponding relationships between a plurality of numbers and name identification, and receive the name identification returned by the yellow page server;

automatically determine, based on the name identification and on a set of pre-set and pre-stored rules, a number type of the incoming call number according to whether the name identification was obtained from the local contact list or from the yellow pane server;

during the call, determine an application to be used according to the number type, wherein the determining the application to be used according to the number type comprises:

determining an application name associated with name identification of the incoming call number if the incoming call number is the yellow page number; and determining an application indicated by the application name as the application to be used;

display on a display interface prompt information of application switching; and display a main page of the application on the display interface when detect a switching confirmation operation.

7. The device according to claim 6, wherein the processor configured to determine the application to be used according to the number type is further configured to:

obtain sound information of both communication parties during the call if the incoming call number is the personal number;

convert the sound information into text information;

determine whether a preset application keyword is comprised in the text information; and determine an application indicated by the application keyword as the application to be used if the application keyword is comprised in the text information.

8. The device according to claim 6, wherein the processor configured to display on the display interface prompt information of application switching is further configured to:

display on a call page the prompt information of application switching in the form of text.

9. The device according to claim 6, wherein the processor configured to display on the display interface prompt information of application switching is further configured to:

display, on an application display page where the application is located, an application icon of the application in an animation of a preset vibrating frequency.

10. The device according to claim 6, wherein the processor configured to display on the display interface prompt information of application switching is further configured to:

display, on an application display page where the application is located, an application icon of the application in a brightness distinguishable from that of other icons.

11. A non-transitory computer-readable storage medium having stored therein instructions that, when executed by a processor of a terminal, causes the terminal to perform a method for application switching, the method comprising:

identifying an incoming call number from which an incoming call is initiated;

if a number stored in a local contact list is consistent with the incoming call number, obtaining name identification matching the incoming call number from the local contact list;

if no number stored in the local contact list is consistent with the incoming call number, sending the incoming call number to a yellow page server, wherein the yellow page server stores corresponding relationships between a plurality of numbers and name identification, and receiving the name identification returned by the yellow page server;

automatically determining, based on the name identification and on a set of pre-set and pre-stored rules, a number type of the incoming call number according to whether the name identification was obtained from the local contact list or from the yellow pane server;

during the call, determining an application to be used according to the number type, wherein the determining the application to be used according to the number type comprises:

determining an application name associated with name identification of the incoming call number if the incoming call number is the yellow page number; and determining an application indicated by the application name as the application to be used;

displaying on a display interface prompt information of application switching; and displaying a main page of the application on the display interface when detecting a switching confirmation operation.

12. The non-transitory computer-readable storage medium according to claim 11, wherein the determining the application to be used according to the number type comprises:

obtaining sound information of both communication parties during the call if the incoming call number is the personal number;

converting the sound information into text information;

determining whether a preset application keyword is comprised in the text information; and determining an application indicated by the application keyword as the application to be used if the application keyword is comprised in the text information.

* * * * *